(12) United States Patent
Heim et al.

(10) Patent No.: US 6,261,128 B1
(45) Date of Patent: Jul. 17, 2001

(54) CONTACTING DEVICE FOR A CHIP CARD AND IN PARTICULAR FOR A SIM CARD

(75) Inventors: Michael Heim, Heilbronn; Andreas Laage, Bietigheim, both of (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/564,645

(22) Filed: May 3, 2000

(30) Foreign Application Priority Data

May 3, 1999 (DE) .............................................. 199 20 321

(51) Int. Cl.[7] .................................................... H01R 24/00
(52) U.S. Cl. .......................... 439/630; 439/326; 439/629; 439/633; 439/680
(58) Field of Search ..................... 439/629, 630, 439/631, 632, 633, 634, 635, 680, 326

(56) References Cited

U.S. PATENT DOCUMENTS 6,075,706 * 6/2000 Learmonth et al. .................. 361/737
6,101,372 * 8/2000 Kubo ....................................... 455/90

* cited by examiner

*Primary Examiner*—P. Bradley
*Assistant Examiner*—Truc Nguyen
(74) *Attorney, Agent, or Firm*—Blank Rome Comisky & McCauley, LLP

(57) ABSTRACT

There is provided a contacting device (1) for chip cards, preferably for SIM cards, comprising a base (2), a slider (12) arranged at the base (2) and being movable with respect to the base (2), the chip card (4) being slidable between an insert/removal position and a reading position by means of said slider, and means (7, 22) for inhibiting removal of the slider from the contacting device (1). Preferably, the slider (12) is slidably mounted to the base (2) and is in abutting engagement with an abutment in the insert/removal position such that the slider (12) cannot be removed from the contacting device (1), i.e. the slider (12) cannot be moved beyond the insert/removal position. Thus, the contacting device does not comprise any loose parts that could get lost. In accordance with another embodiment of the present invention, there is provided a contacting device (1) for a chip card (4) comprising a stationary base (2) and a movable slider (12), wherein a chip card (4) is slidable between an insert/removal position and a reading position, wherein a metal cover (24) is fixedly mounted to the contacting device (1) and for providing support for the chip card (4) for providing counter-forces taking up contacting forces between contacting elements of the contacting device (1) and contacting pads of the chip card. Preferably, the contacting device (1) has a card plenum (11) for receiving the chip card (4), and the metal cover (24) spans the card plenum (11) as well as the slider (12) and extends around the sides of the base (2). By using a metal cover, a particularly small thickness is possible for this component. Further, the metal cover is easy to manufacture and to assemble.

7 Claims, 4 Drawing Sheets

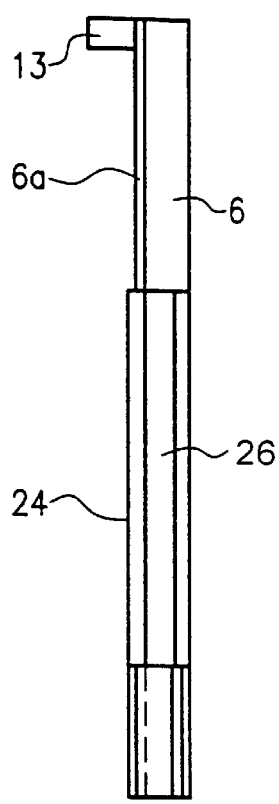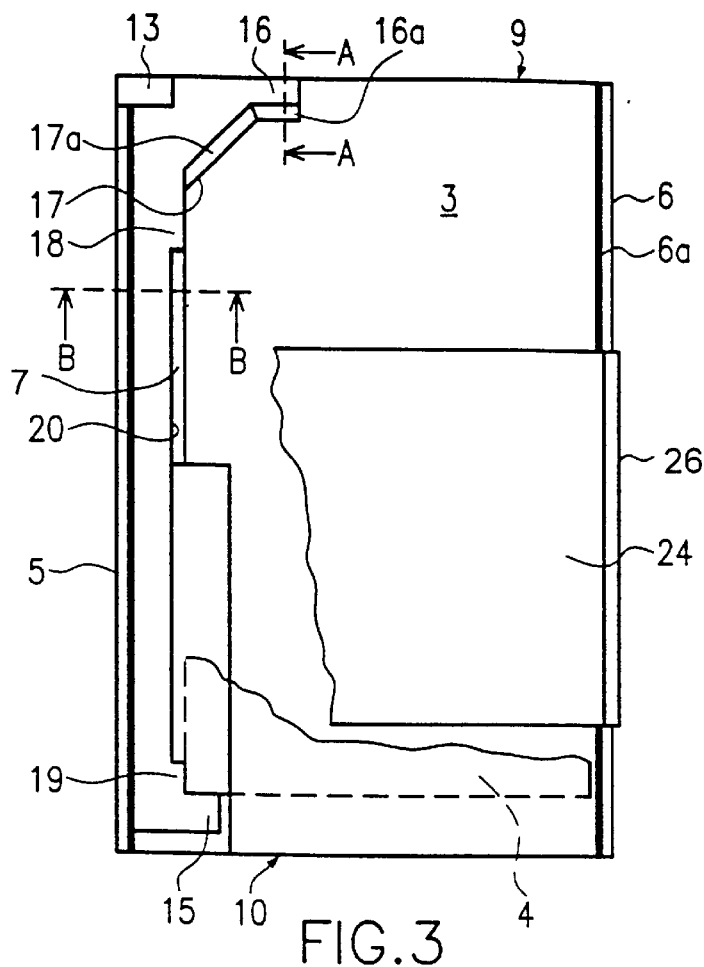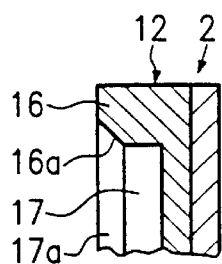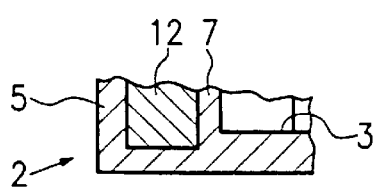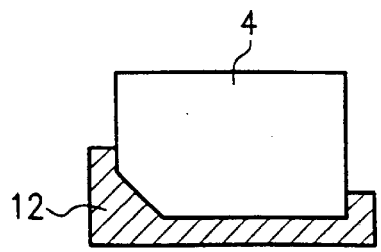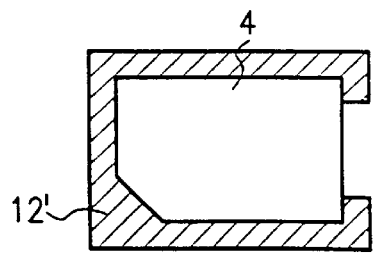

CONTACTING DEVICE FOR A CHIP CARD AND IN PARTICULAR FOR A SIM CARD

BACKGROUND OF THE INVENTION

1. Field of the Invention

The present invention relates to a contacting device for a chip card and in particular for a SIM (subscriber identity module) card. Chip cards and/or SIM cards are also known as smart cards.

2. Description of Related Art

Contacting devices for chip cards are known in the art. Such contacting devices are also known as chip card readers or smart card readers, or in particular when used with SIM cards, as SIM card readers. With many slide-in approaches for SIM cards such as cards having the ID-000 format for mobile telephones, the SIM card conventionally is inserted or placed in a kind of loose or separate drawer or cover, and the drawer is slid into a slot opening of the contacting device. With this design the separate drawer may get lost. Further, the drawer and the contacting device must comprise some kind of guide means for guiding the drawer in the contacting device, such guide means requiring additional space with respect to height and width. Moreover, ejecting means are necessary to enable withdrawal or removal of the drawer from the contacting device.

For miniaturization, particularly in the field of mobile telephones, it is an object of the present invention to make a contacting device for a SIM card as small as possible. Of particular importance is a small thickness or height of the contacting device. Preferably, a contacting device should be barely larger than the SIM card itself. Furthermore, loose parts should be avoided such that nothing can get lost. The contacting device should be of simple construction and easy to operate. Misalignment or wrong orientation of the SIM card should be avoided.

SUMMARY OF THE INVENTION

These objects are achieved according to the present invention by providing a contacting device for a chip card, and in particular for a SIM card, comprising a stationary base, a slider arranged at the base and being movable with respect to the base, the chip card being slidable between an insert/removal position and a reading position by means of said slider, and means for inhibiting removal of the slider from the contacting device. Preferably, the slider is slidably connected to the base and is in abutting engagement with an abutment in the insert/removal position such that the slider cannot be removed from the contacting device, i.e. the slider cannot be moved beyond the insert/removal position. Thus, the contacting device does not comprise any loose parts that could get lost.

In accordance with another embodiment of the present invention, there is provided a contacting device comprising a stationary base and a movable slider, wherein the chip card is slidable between an insert/removal position and a reading position, wherein a metal cover is fixedly mounted to the contacting device for providing support for the chip card so as to provide reaction forces taking up contacting forces exerted by contacting elements of the contacting device. Preferably, the contacting device has a plenum or card receiving space for receiving the chip card, and the metal cover spans the card plenum as well as the slider and extends or reaches around the sides of the base. By using a metal cover, a particularly small thickness is possible for the cover. Further, the metal cover is easy to manufacture and to assemble.

According to another preferred embodiment of the invention, the slider is slidably arranged at the side and in longitudinal direction of the contacting device next to the inserted chip card. Since the chip card and the slider are not overlapping as seen in a top plan view, a particularly small thickness or height of the contacting device is possible.

Further, an outer end of the slider, i.e. an end extending outside of the contacting device when said slider is extracted or pulled out from the contacting device, may be flush with the contacting device or its contour in the reading position of the chip card. Thus, mounting of the contacting device is easily possible even at locations where projecting elements must be avoided. For example, the contacting device may be mounted in a mobile telephone at a location which is accessible from the battery bay such that the battery pack may be inserted or put into place with the slider being the retracted position, i.e. with the chip card being in the reading position; the battery pack then covers the contacting device and protects it from access or dirt.

In order to make the contacting device as compact as possible also in the lateral direction, preferably a first side wall of the base is used for lateral guidance of the chip card. The slider may be guided between a second side wall of said base and a rib extending substantially parallel thereto inside the contacting device such that the contacting device requires minimum space. Preferably, the distance between the first side wall and the rib is approximately equal to the width of the chip card.

According to another preferred embodiment of the present invention, the slider has an oblique polarization surface for engagement with a corresponding oblique polarization surface of the chip card so as to ensure proper alignment or orientation of the chip card.

Generally speaking, the slider comprises means for guiding the chip card in direction of insertion of the chip card as well as transversely thereto. In particular, said means for guiding may comprise abutment surfaces and/or projections on the slider.

For improved guidance of the slider within the contacting device, the base of the contacting device comprises a recess forming a track for the slider. On said track, a projection or pin may be provided which extends into an elongate recess in the slider. The projection or pin may limit movement of the slider in direction of sliding (or extraction/retraction) by coming into abutment with one or the other end of the elongate recess in the slider. Further, the projection and recess provide additional guidance for the slider.

BRIEF DESCRIPTION OF THE DRAWINGS

Further features of the present invention will become apparent to those skilled in the art to which the present invention relates from reading the following description of a preferred embodiment with reference to the accompanying drawings, in which:

FIG. 3 is a top plan view of the contacting device of FIG. 1 with certain parts being cut away;

FIG. 4 is a side view of the contacting device of FIG. 1;

FIG. 5 is a sectional view along line A—A in FIG. 3 showing a detail of the contacting device;

FIG. 6 is a sectional view along line B—B in FIG. 3 of the contacting device;

FIG. 7 is a schematic view of a slider together with a SIM card, said slider being used in connection with the first embodiment of the contacting device;

FIG. 8 is a schematic view of an alternative design of a slider having a frame-like structure, said slider being shown together with a SIM card;

DETAILED DESCRIPTION OF A PREFERRED EMBODIMENT

Figure 1:
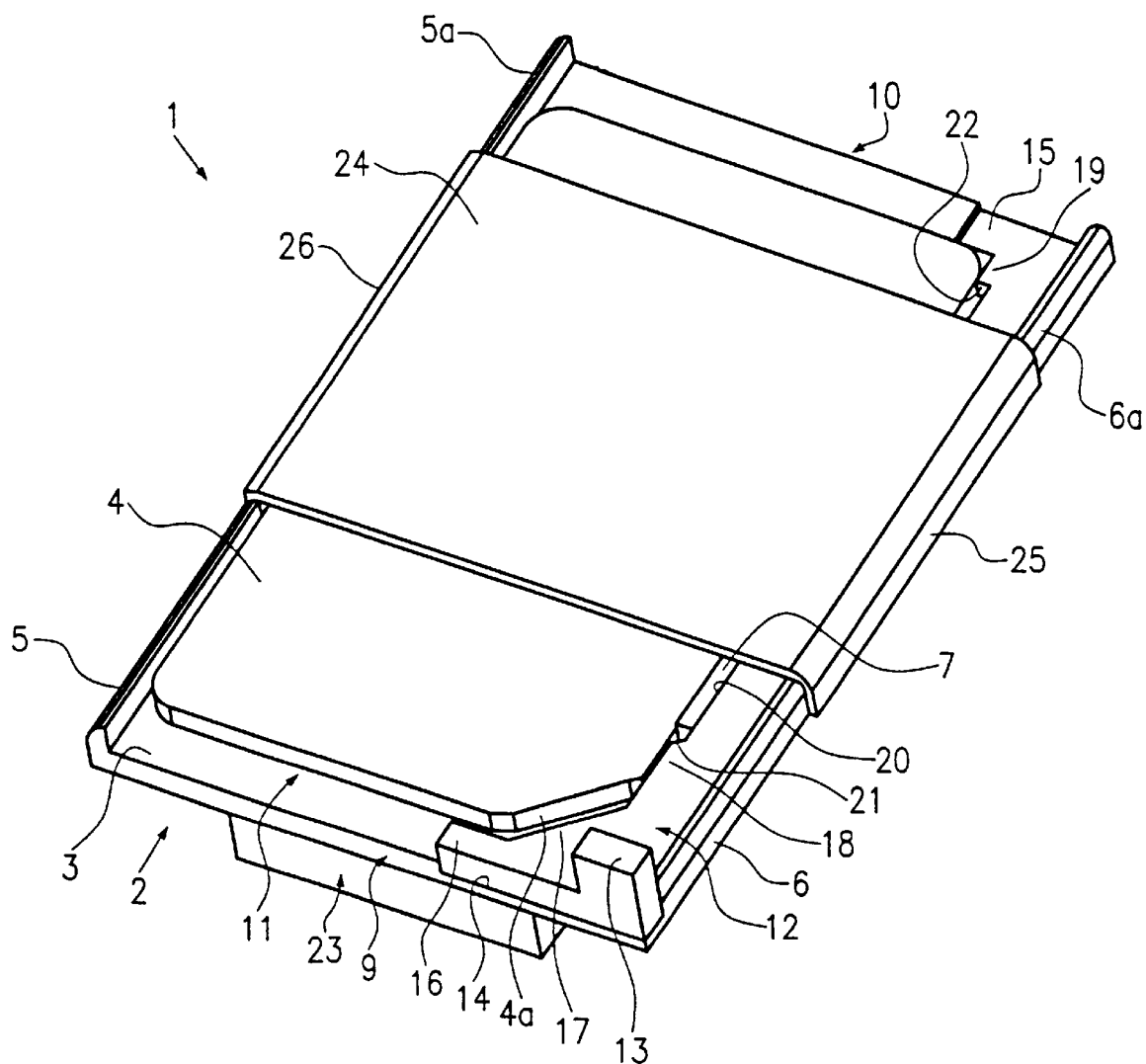
FIG. 1 is a perspective view of a contacting device in a reading position in accordance with a first embodiment of the present invention.

FIGS. 1–4 show a contacting device comprising a base including contacting elements, a cover and a movable slider. The contacting device has a reading position as shown in FIG. 1 and a card insert/removal position shown in FIG. 2. The contacting device 1 has a stationary base 2 with a support surface 3 for a SIM card 4. The base 2 is preferably a plastic injection molded part. At one longitudinal side of the base 2 the support surface 3 is bordered by a flange-like first side wall 5 with said first side wall 5 providing lateral guidance for the SIM card 4. The first side wall 5 extends preferably along the entire length of the base 2 and has a height extending above the support surface 3 which corresponds approximately to the height or thickness of a SIM card 4 placed on said support surface 3. At the opposite longitudinal side of the base 2, a second side wall 6 is provided which is also of a flange-like design and preferably has the same height as the first side wall 5. The distance or spacing between the first and second side walls 5 and 6 is larger than the width of the SIM card 4.

A rib or projection 7 is provided at the side opposite to the first side wall 5 for lateral guidance of the SIM card 4. As can be seen in FIG. 1, said rib 7 extends parallel to the first and second side walls 5 and 6 and limits the support surface 3 for the SIM card 4 in lateral direction, such that the SIM card 4 is laterally guided between said first side wall 5 and said rib 7. Rib 7 extends in longitudinal direction only along a portion of the length of the contacting device 1, and is spaced from a front end 9 and a rearward end 10 of the base 2. The height of the rib 7 is preferably equal to the height of the side walls 5 and 6, i.e. the height of the rib 7 corresponds to the height of thickness of the SIM card 4 which is placed on the support surface 3. Thus, a plenum or a card receiving space 11 for the SIM card 4 is formed between the support surface 3 and the rib 7.

In a lateral region of the base 2 between the rib 7 and the second side wall 6, a movable slider or carriage 12 is guided. In the reading position, i.e. in the closed condition of the contacting device, the slider 12 preferably extends across the entire length of the base 2. The slider is relatively narrow in lateral direction. The slider 12 is preferably a plastic part may by injection molding. The slider 12 could, however, consist of other materials, for instance, it could be made from metal.

Figure 2:
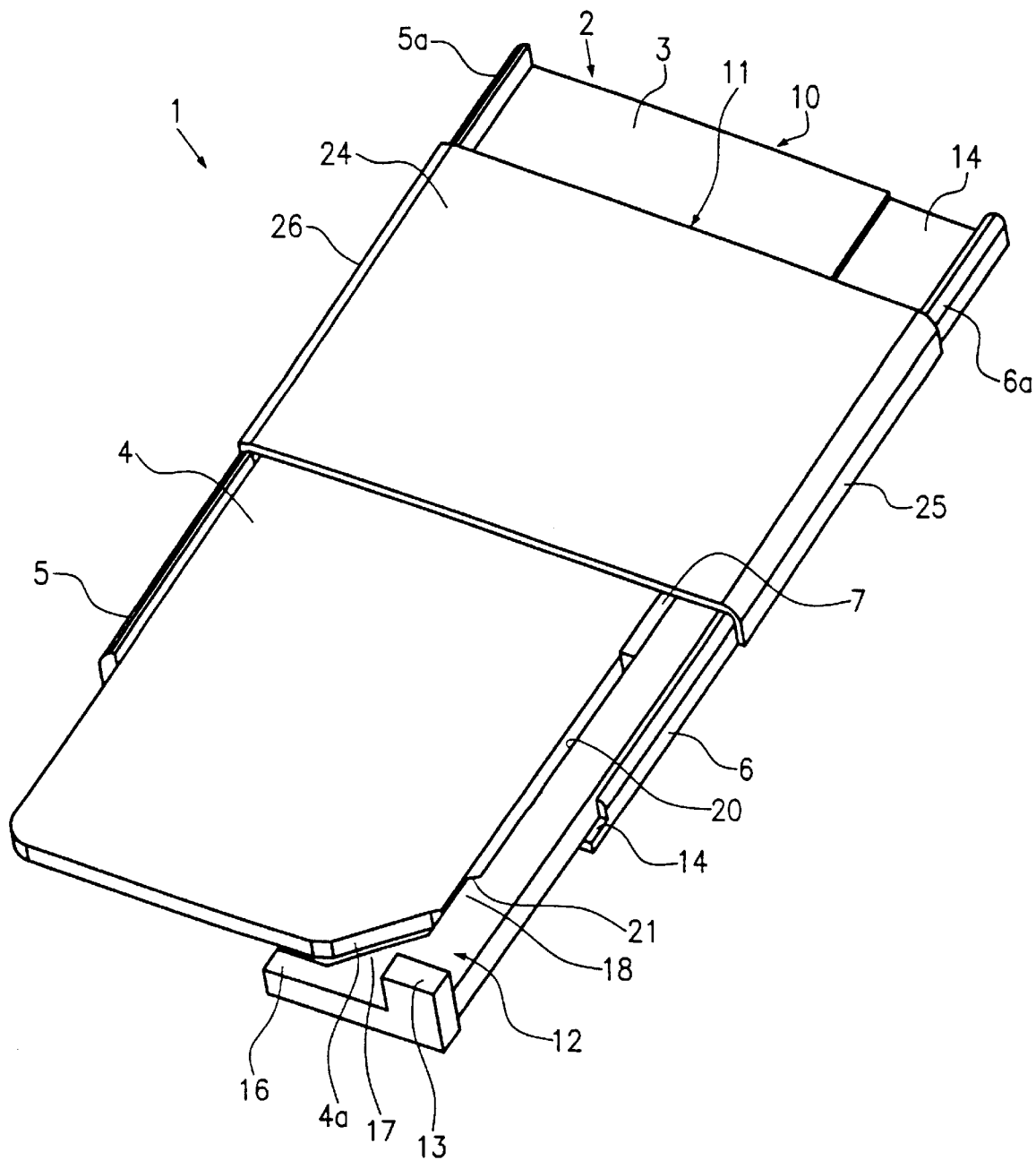
FIG. 2 is a perspective view of the contacting device of FIG. 1 in a card insert/removal position.

The slider 12 has a constant thickness or height with the exception of a first projection 13 preferably extending upwardly. The projection 13 is provided to facilitate pulling the slider 12 out of the device. In FIGS. 1 and 2, the height or thickness of the slider 12 is shown as being somewhat larger than the height of the card channel 11. Correspondingly, in the base 2 there is provided a respective recess 14 in which the slider 12 moves. The recess 14 forms a track for the slider and also provides guidance for the slider. Alternatively, it would be possible not to provide for a recess 14 but to design the slider 12 with a height or thickness which corresponds to the height of the card plenum 11, i.e. with the slider 12 having a thickness approximately equal to the thickness of a SIM card.

The first projection 13 can be easily grasped by hand, for instance with a finger, so as to pull the slider out of or to push the slider into the device.

In plan view, the contour or outline of the slider 12 is preferably as follows (see in particular FIGS. 3 and 7). At the rearward end of the slider 12, a second projection 15 is provided which serves as an abutment for the SIM card 4 in longitudinal direction. When the slider 12 is pulled out, the SIM card 4 is carried along by means of the second projection 15 and is moved out of the card channel or plenum 11.

At the front end of the slider 12 a lateral third projection 16 is formed which merges into an oblique polarization surface 17. The third projection 16 serves as an abutment for the SIM card in longitudinal direction (opposite to the second projection 15). When the slider 12 is pushed into the device toward the reading position, the SIM card 4 is carried along by means of the third projection 16 and is moved into the card channel or plenum 11.

The oblique polarization surface 17 is a means for providing for correct insertion of the SIM card 4 inasmuch as the SIM card 4 has a corresponding oblique polarization surface 4a. In longitudinal direction of the slider as seen from front to rear, the oblique polarization surface 17 is followed by a first section 18 having a width corresponding approximately to the distance between the side walls 5 and 6 minus the width of the SIM card 4. A second section 19 having a corresponding width is disposed adjacent to the second projection 15 close to the rear end of the slider 12. Thus, the SIM card 4 is guided laterally by the sections 18 and 19 of the slider as well as the rib 7 on one side, and by the first side wall 5 on the other side. Between the sections 18 and 19, a lateral recess 20 for the rib 7 is formed. A first abutment 21 is formed at the transition between the first section 18 and the recess 20, and a second abutment 22 is formed at the transition between the second section 19 and the recess 20, said second abutment 22 corresponding to the first abutment 21 but facing in the opposite direction.

In the closed condition of the contacting device, i.e. with the slider 12 being slid into place inside the contacting device, the abutment 21 is positioned adjacent to the longitudinal front end of the rib 7, thus defining one end position of the slider 12 in the reading position of the contacting device 1. When pulling out the slider 12, the slider 12 is guided between the rib 7 and the second side wall 6. The rib 7 moves in the recess 20 until the abutment 22 comes into engagement with the longitudinal rear end of the rib 7, thus defining an end position of the slider with respect to the pulling out thereof. During pulling out, the slider 12 is guided additionally in that the projection 15 is guided in the recess 14 in the base 2.

Figure 10:
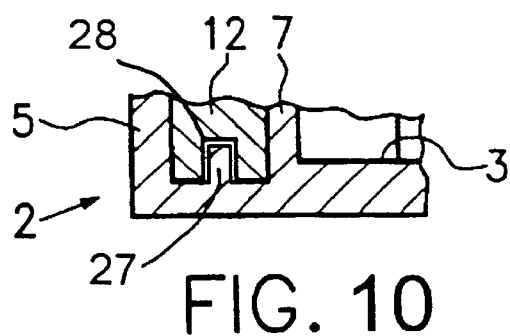
FIG. 10 is a sectional view of a detail of a chip card reader in accordance with the embodiment of FIG. 9 and is similar to FIG. 6 above.

Preferably, in a modification of the present invention shown in FIG. 10, the slider 12 is also guided by a projection or pin 27 projecting from the recess or track 14 on the base and moving in a corresponding elongate recess 28 in the slider, said recess 28 having a width and depth adapted to receive the pin 27 and extending in longitudinal direction of the slider 12. As an alternative or in addition to the limitation of the movement of the slider 12 by means of the rib 7 and the abutments 21, 22, the pin 27 may limit movement of the slider 12 by abutting against longitudinal ends of the elongate recess 28.

In the front area of the base 2, i.e. between rib 7 and the front end 9 of the base 2, the recess 14 preferably is formed corresponding to the contour or outline of the slider 12 so as to form another abutment for the slider 12 when said slider 12 is pushed into the device. Further, the recess 14 forming a track for the slider may provide an abutment for the first projection 15 of the slider in the extended position of the slider 12, i.e. in the card insert/removal position of the contacting device.

Figure 9:
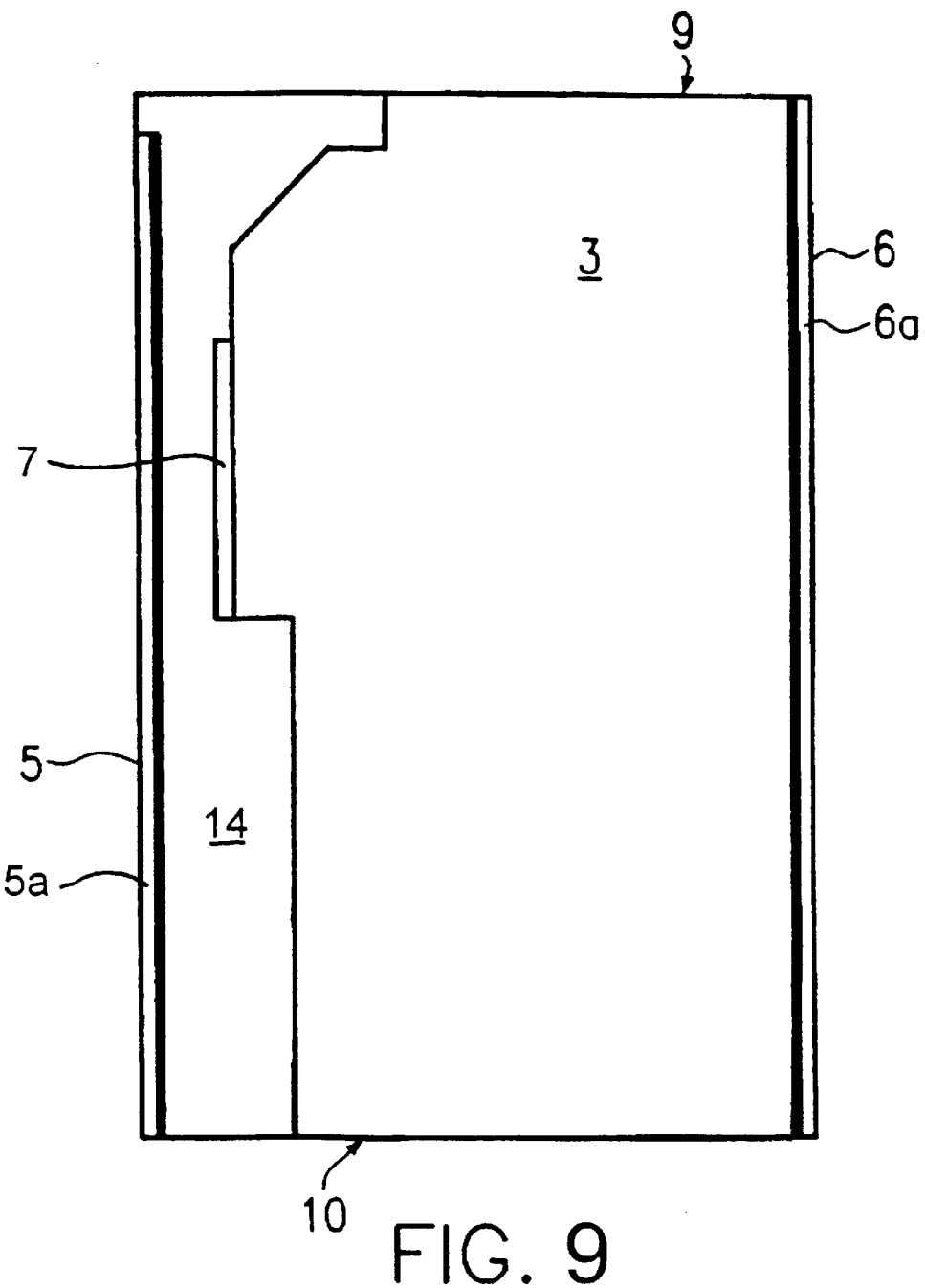
FIG. 9 is a top plan view of the base of another embodiment of the chip card reader with the cover and the slider being removed and no chip card being inserted.

The relative position of the base 2, the side walls 5, 6, the rib 7, and the recess 14 may be seen best in FIG. 9 which is a top plan view of the base 2 with the cover 24 and the slider 12 being removed. In FIG. 9, there is also shown the pin 27.

In a top plan view (cf. FIGS. 3 and 7), the slider 12 is disposed completely outside the contour of the inserted SIM card 4. There is no overlap of the slider 12 and the SIM card 4, i.e. the slider 12 does not extend over or under the SIM card 4 which is another reason for the small height of the contacting device 1.

Contacting elements (not shown) for contacting contact pads of the SIM card protrude at appropriate locations from the support surface 3. For example, the free ends of the contacting elements could be disposed in slits or slots in the base 2, and the fixed ends of the contacting elements could be fixed or mounted by being embedded by injection molding. Preferably, the contacting elements are pretensioned or biased. It is also possible to provide a recess in the support surface in which a separate contact block comprising said contact elements may protrude. Such a contact block could e.g. be mounted to a printed circuit board.

As indicated schematically at 23 in FIG. 1, the contact elements are exposed at one end face of the contacting device 1 for connecting purposes (contact terminals). However, it is also possible and may be preferred to have the contact elements exit on both longitudinal sides, or end faces, of the contacting device so as to provide contact terminals on both sides of the contacting device.

Preferably, the card channel or plenum 11 is limited towards the top by a cover 24. The cover 24 is preferably made of metal, in particular sheet metal. This enables to use a small thickness of the material of the cover while providing great strength thereof, and sufficient counter-force is provided to press the SIM card 4 against the contact elements and to hold the SIM card 4 on the support surface 3. In other words, the cover 24 provides counter-forces taking up the contacting forces. In the reading position, the SIM card 4 abuts against the cover 24 and is thus supported. Without the cover 24, the elastic contact elements protruding beyond the support surface 3 would lift the SIM card 4 off the support surface 3 in the plenum 11 and there would be no sufficient pressing force or contact pressure between the contact elements and the contacting pads of the SIM card 4. The cover 24 thus serves as a support for the contact forces. Further, the cover 24 elevationally fixes the slider 12 such that the slider 12 is held in its guidance formed by the second side wall 6 and the rib 7, and the recess 14, if provided.

Furthermore, by using a metal cover, advantages with respect to electro-magnetic protection or isolation may be achieved. Preferably, the cover 24 extends in longitudinal direction only over part of the plenum 11, in particular at least in that area where contacting of the SIM card 4 and the contacting elements occurs. The cover 24 retains the SIM card 4 in contact with the support surface 3 against the elastic force of the contact elements so as to thereby provide a necessary contacting force between the contact sections of the contacting elements and the contact pads of the SIM card.

However, it is also conceivable to omit the cover 24 and assemble or mount the contacting device such that another component fulfills the function of the cover 24 by mounting the contacting device such that the top thereof, i.e. the top ends of the side walls 5 and 6 and also the top end of the rib 7 comes into abutting engagement with a flat component such as a housing or the battery bay portion. In this instance, fastening to said flat component would be possible by way of bolts, detent means, hooks etc.

When using a cover 24 as shown in the drawings, the cover 24 is preferably a bent sheet metal part having substantially U-shaped flanges 25 and 26 on its sides. The flanges 25 and 26 extend or reach around the side walls 5 and 6 and hold the cover 24 on the base 2. It is preferred that the cover 24 is slid from the rear end 10 onto the base 2 during assembly. In order to make the contacting device 1 as compact as possible, the side walls 5, 6 may be recessed at the top and/or on the sides and/or at the bottom by an amount corresponding to the thickness of the material of the cover 24, said recess being provided in the area from the rear end 10 of the base 2 up to a location where the front end of the cover 24 is disposed in the assembled state, such that the cover 24 may be slid onto the base 2 from the rear end 10 and is stopped in the fully assembled position by an abutment, in a preferred embodiment, only the bottom of the side walls 5, 6 is recessed for receiving a part of the flanges 25, 26 extending generally parallel to the main portion of the cover 24.

Preferably, the outer edges of the side walls are provided at the top and/or at the bottom (as seen in FIGS. 1 or 2) with a bevel 5a, 6a so as to accommodate a bending radius of the cover 24. For easier manufacturing, the bevel 5a, 6a may extend over the entire length of the side walls 5, 6.

In the assembled condition, the cover 24 spans the plenum or card channel 11 at least in an area where contacting of the SIM card 4 and the contacting elements occurs. The rib 7 is disposed at least partially under the cover 24 and may extend over a certain distance towards the front end 9 of the base 2 into an area which is not covered by the cover 24.

The relationship of the above mentioned components of the contacting device 1 is preferably chosen with respect to sizes such that a SIM card 4 may be slid from above partially under the cover 24 in the insert/removal position of the contacting device 1 as shown in FIG. 2, and is thereby inserted into the slider 12 such that the SIM card 4 is ultimately disposed in parallel to the support surface 3 on the base 2. This means that the SIM card 4 is partially supported by the support surface 3 of the base 2, and the SIM card 4 is further guided in a lateral direction by the first side wall 5, by the rib 7, and by the sections 18 and 19 of the slider 12; the SIM card 4 is retained in longitudinal direction by the projections 15 and 16; and the proper position of the SIM card 4 is clearly defined by the oblique polarization surface 17. Should the SIM card 4 be inserted in a wrong orientation, then it will not be possible to bring the SIM card 4 in parallel with the support surface 3 without strongly bending the slider 12. Inserting or pushing in of the slider 12 together with the SIM card 4 into the contacting device 1 will then not be possible. Thus, proper orientation of the SIM card 4 is already asserted visibly for the user when placing the SIM card 4 in the pulled out slider 12, and potential use of force with subsequent damage to the contacting device is reliably avoided as would be otherwise conceivable with an oblique polarization surface inside a contacting device which would be invisible from the outside.

Preferably, the slider 12 is flexible to a certain degree so as to be able to yield somewhat during insertion and/or removal of the SIM card 4 until the SIM card 4 has reached the predetermined position in which it is (at least) partially surrounded by said slider 12, or until the SIM card 4 is completely removed, respectively. In a preferred embodiment, the slider 12 consists of a tough molded material so as to provide the desired flexibility. In addition, the flexibility of the SIM card 4 itself may be used for inserting and removing the SIM card 4.

As is shown in FIGS. 3 and 5, a bevel 16a and 17a, respectively, is provided at the second projection 16 and/or at the oblique polarization surface 17 of the slider 12 for easier insertion and/or removal of the SIM card 4.

When inserting or sliding the SIM card 4 into the contacting device 1 using the slider 12, the SIM card 4 is brought into its reading position in which the contacting elements of the contacting device 1 are in contact with the contact pads of the SIM card 4. In the reading position shown in FIG. 1, the slider 12 is preferably flush in the longitudinal direction with the ends 9 and/or 10 of the base 2.

Removing of the SIM card 4 is done in the opposite sequence as described above with respect to the insertion thereof. Thus, the slider 12 may also be considered an ejector or ejecting means.

It should be noted that the first projection 13 of the slider 12 does not necessarily have to be at the location and in the shape as shown in the drawings. The embodiment shown has the advantage that the entire contacting device 1 in the reading position is flush at the front end 9. If a flush front end of the contacting device is not required, the slider 12 could also be grasped and moved in a different manner. For example, this could be achieved by a tongue at the front end of the slider 12 wherein said tongue would project from the front end.

If sufficient space is available in lateral direction, instead of the slider 12 as shown, also a frame-like slider 12' could be used which endorses or encircles the SIM card 4 in a generally U-type manner or even completely (see FIG. 8). In this case, in the area of the first side wall 5, there would be preferably provided a construction similar to that on the right side of the embodiment shown (i.e. rib 7, recess 20, card guiding sections 18, 19). The second projection 16 could then be extended over the entire width of the card and could merge into the leg of the slider extending on the left hand side.

The present invention provides an extremely compact contacting device for a SIM card which, while using as little material as possible, affords reliable orientation of the SIM card in the reading position as well as simple insertion and removal of the SIM card in the longitudinal direction of the contacting device, wherein sufficient contacting forces are provided between the contacting elements of the contacting device and the contact pads of the SIM card.

What is claimed is:

1. A contacting device for a chip card, comprising a stationary base having a first and second side wall and a rib extending substantially parallel to the second side wall and a movable slider, wherein the chip card is slidable between an insert/removal position and a reading position, wherein a metal cover is fixedly mounted to the contacting device for providing support for the chip card for providing counter-forces taking up contacting forces between contacting elements of the contacting device and contacting pads of the chip card, wherein said first side wall is used for lateral guidance of the chip card and wherein the slider is guided between the second side wall and the rib.

2. The contacting device of claim 1, further comprising a card plenum for receiving the chip card, wherein the metal cover spans the card plenum as well as the slider and extends around the sides of the base.

3. The contacting device of claim 1, wherein the distance between the first side wall and the rib is approximately equal to the width of the chip card.

4. The contacting device of claim 1, wherein the slider has an oblique polarization surface for engagement with a corresponding oblique polarization surface of the chip card.

5. The contacting device of claim 1, wherein the slider comprises means for guiding the chip card in direction of insertion of the chip card as well as transversely thereto.

6. The contacting device of claim 1, wherein said base comprises a recess forming a track for guiding the slider when said slider is moved relative to said base.

7. The contacting device of claim 6, wherein a pin is provided on said track said pin projecting from said base and cooperating with an elongate recess in said slider for guiding said slider.

* * * * *